Patented Aug. 3, 1943

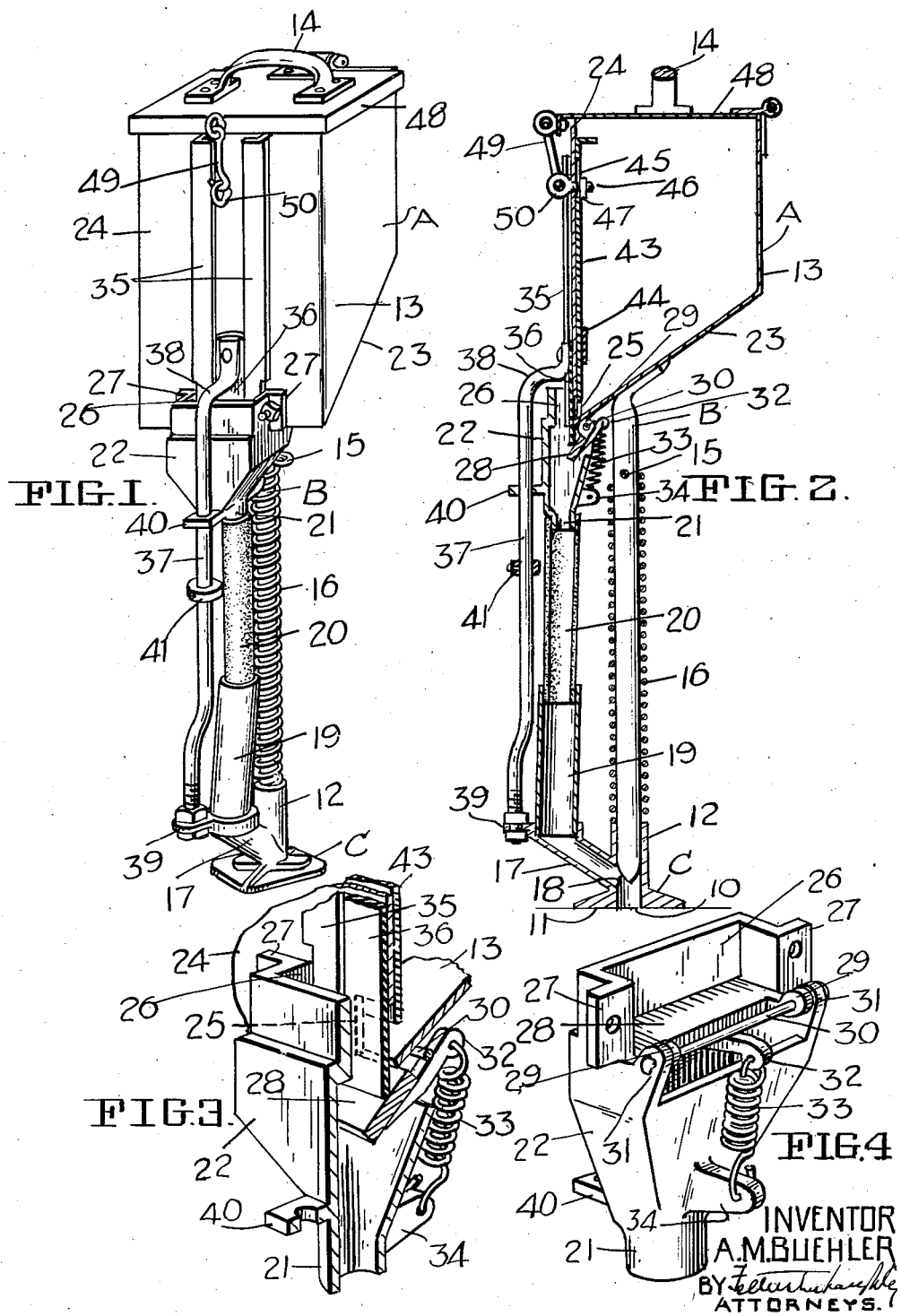

2,325,939

UNITED STATES PATENT OFFICE 2,325,939

GARDEN IMPLEMENT

Allan Moyer Buehler, Preston, Ontario, Canada

Application January 29, 1942, Serial No. 428,749

9 Claims. (Cl. 111—96)

This invention relates to garden implements and particularly to an implement for fertilizing tree roots.

It is an object of the invention to provide a garden implement which is particularly designed as a tree root fertilizer through which a hole may be pierced in the ground down to the tree roots and fertilizing material injected in such hole immediately that it is formed.

A further object of the invention is to provide an implement of this character which is relatively simple in construction and which is simple and convenient to operate.

A further object of the invention is to provide an implement of this character which may be adapted to several uses apart from fertilizing.

With these and other objects in view the invention generally comprises an implement having a foot formed with a bearing face designed to compress the earth upon which it rests and having an opening therethrough and a plunger connected with said foot designed to be projected through the opening into the earth to form an elongated hole therein, the bearing face compressing the earth over an area surrounding the hole to prevent adjacent earth from discharging thereinto.

The construction also includes a tube connected with the opening in the foot, a hopper adapted to communicate with the tube and cooperating means for establishing and disestablishing communication between the hopper and the tube upon operation of the plunger.

The invention is designed particularly for supplying fertilizer to the roots of trees but also may be employed as a transplanting implement and might also be used in seeding as will appear from the following detailed specification taken in conjunction with the accompanying drawing.

In the drawing:—

Fig. 1 is a perspective view of a preferred construction according to the present invention.

Fig. 2 is a longitudinal section taken through the implement.

Fig. 3 is an enlarged detailed perspective partly in section to illustrate the valve means employed between the hopper of the implement and a discharge tube employed therewith.

Fig. 4 is an enlarged perspective of the fitting connecting with the hopper and establishing connection with the discharge tube of the implement.

Referring to the drawing, A indicates the garden implement as a whole which in its simplest form includes a plunger B and a foot C, the latter being designed to bear upon the ground and being formed with a central opening 10 and an earth compressing bearing face 11 surrounding the opening 10. The lower end of the plunger B is designed to be positioned directly over the opening 10 and preferably the foot is formed with the tubular extension 12 aligned with the opening 10 and receiving the lower end of the plunger.

The plunger B is designed to be connected with a suitable handle which in the present instance is connected with the plunger by means of a hopper 13 carrying a suitable handle 14 while extending between the upper edge of the tubular member 12 and a suitable stop 15 on the plunger B is a coil spring 16. The coil spring retains the plunger in normal position the lower end of which is housed within the tubular member 12 and disposed above the opening 10 in the foot but upon downward pressure being applied to the plunger through the handle 14 the latter is caused to project through the foot into the earth to form an elongated hole therein whereupon it is returned to normal position by means of the coil spring 16. In this operation the foot C by means of its bearing face 11 of substantial area surrounding the opening 10 compresses the earth over a substantial area surrounding the hole made by the plunger to thus prevent adjacent earth from discharging into the hole so formed and thus provide for the formation of a clean cut elongated hole in the ground by means of one simple operation.

The depth of the hole formed in the earth may be gauged by any suitable means which will permit the plunger to project past the bearing face of the foot C to a predetermined extent. One manner of gauging the depth of the hole will be described hereinafter.

Preferably the implement is formed with further structure so as to adapt it for discharging material into the hole formed in the earth, for instance, such as fertilizer in the fertilizing of the roots of trees. In this instance a conduit 17 is connected with the foot C and opens into the tubular extension 12 as at 18 above the opening 10. To this an upright tubular element 19 is connected designed to slidably receive a preferably flexible tubular connector 20 which is designed in effect to constitute an auxiliary hopper and is connected to the hopper 13. The base of the hopper 13 is preferably sloped as at 23, the lower end of the sloped base connecting with the rearward vertical wall 24 of the hopper. In the rear wall 24, extending upwardly therein from its point of connection with the base 23, is a discharge opening 25.

The fitting or auxiliary hopper 22 is formed with a receiving chamber 26 in its upper end which in breadth is substantially one-half the width of the upper end of the fitting and is preferably provided at each side with laterally projecting flanges or lugs 27 to form a means for securing the fitting to the hopper. It is secured on the hopper just above the junction between the base 23 and the rear wall 24 so that this junction point of the hopper will be disposed beside the base of chamber 26 with the lower part of wall 24 forming a side wall of the receiving chamber and the discharge opening 25 opening directly into it.

The base of the receiving chamber 26 is formed by a gate valve 28, having lugs 29 projecting therefrom and hingedly mounted on a pin 30 passing through the lugs 29 and through lugs 31 on the fitting 22. The gate valve 28 is provided with a rearwardly projecting arm 32 which is anchored by way of a coil spring 33 to an anchoring post 34 on the fitting so that the gate valve is always under spring tension which normally would tend to retain it in the position shown in Fig. 4, closing the bottom of the receiving chamber 26.

On the rear wall 24 of the hopper 13 a suitable slide is formed by means of the opposed spaced apart plates 35 designed slidably to receive the slide plate 36. This slide plate is designed normally to close the opening 25 in the hopper 13 as shown in Fig. 2 where it is in its normal position and in this position the lower end of the slide plate engages the gate valve 28 of the receiving chamber 26 to hold it in a downwardly inclined position against tension of its coil spring 33, thus to establish communication between the chamber 26 and the tubular connector 29.

Rigidly connected to the slide plate 36 is an actuating rod 37 which is designed to extend downwardly, parallel with a tubular connector 29 and the tubular element 19. This rod is suitably bent as at 38 so as to space it from these latter mentioned members and its lower end is designed to be rigidly attached to the foot C such as by a laterally projecting ear lug 39 disposed on the inclined conduit 17. Thus, it will be appreciated that upon depression of the plunger B through the opening 10 into the earth the hopper 13 will move downwardly as well as the fitting 22 and tubular connector 29 which telescopes in the tubular element 19, while the rod 37 anchored on the foot C will remain stationary so that the slide plate 36 will move upwardly in the slide 35.

By providing a projecting guide member 40 on the fitting 22 through which the rod 37 may pass and by providing any suitable means such as an adjustable collar 41 on the rod 37 the extent to which the lower end of the plunger B may be projected past the opening 10 in the foot C may be directly gauged and it only requires an adjustment of the collar 41 up or down on the rod 37 to determine the extent to which this rod and the plunger will move relatively to one another before contact is made between the guide 40 and this collar.

When the plunger B is pushed downwardly with the hopper 23 and the slide plate 36 moved upwardly as above referred to, the discharge opening 25 from the hopper is gradually uncovered. At the same time the gate valve 28 follows the upward movement of the plate 36 and closes the base of the chamber 26 in fitting 22 as the lower end of plate 36 moves above the lowermost portion of the hopper 13. Thus, material within the hopper 13 is permitted to discharge through the opening 25 and will be received within the chamber 26 of fitting 22 and retained there by the gate valve 28 during the time that the plunger is in the earth. However, upon eliminating the pressure on the handle 14 the plunger returns to its normal position (Fig. 2) under compression of its coil spring 16 so that upon resuming normal position the slide plate 36 engages the gate valve 28 to open the bottom of receiving chamber 26 and the contents thereof will be discharged therefrom through the connecting member 29, element 19, inclined conduit 17 into the passage of the foot C below the plunger B and through the opening 10 into the hole just previously formed by the plunger in the earth.

The size of the opening 25 may be readily controlled by means of a gauge plate 43 vertically slidable along the inside of the rear wall 24 of the hopper through a suitable guideway formed by a plate or the like 44 suitably spaced from and secured to the rear wall of the hopper. The upper end of the gauge plate 43 is vertically slotted as at 45 to permit the passage therethrough of a pin or the like 46 having a suitable clamp or nut 47. Thus, by sliding the gauge plate 43 downwardly or upwardly the size of the opening 25 may be suitably determined and upon fastening the securing member 47 the plate is readily held in the adjusted position.

The hopper 13 is preferably provided with a hinged cover 48 from which the handle 14 projects, the cover being provided with suitable locking means such as a hook 49 designed to engage with a suitable eye 50 which in a particular compact construction may provide the pin 46 with its fastening 47 which also forms the means for fastening the eye as clearly shown in Fig. 2.

The implement described is particularly adapted for fertilizing of tree roots which presents a problem from the point of view of providing for fertilization in a simple and efficient manner. By employing this implement for this particular purpose holes of sufficient depth are made in the ground around the tree roots and on completion of the holes and withdrawal of the plunger therefrom a predetermined quantity of fertilizing material is automatically discharged into each hole.

The implement might likewise be used as a hand seeder discharging a predetermined quantity of seed into the hole thus formed. Moreover, it will be appreciated that the structure might be formed so as to carry a plurality of plungers and corresponding associated parts.

The device is also readily adaptable as a transplanter for forming transplanting holes in the ground in a clean cut manner and with a minimum of effort. In this connection it will be obvious that the bearing face 11 of the foot which is of substantial area will operate to compress the earth over an area surrounding the hole simultaneously formed by the plunger B, thus preventing such earth from discharging thereinto.

What I claim as my invention is:

1. A garden implement comprising a foot having an elongated passage therethrough and formed with an earth compressing face at one end surrounding said passage, a plunger connected with said foot aligned with and projectable through said opening into the earth when said foot is bearing upon the latter to form an elongated hole therein, said foot, forming means for compressing the earth over the area surrounding said hole to prevent adjacent earth from discharging thereinto, a tubular member connecting with said foot and communicating with said passage, a hopper carried by said plunger having a controllable discharge opening therein and tubular means movable with said plunger and operatively connected with said tubular member for establishing communication between said hopper and the passage in said foot and cooperating means for discharging material from said hopper through said tubular means upon withdrawing said plunger from the earth through said foot.

2. An implement as claimed in claim 1, including a slidable gauge plate connected with the hopper for varying the size of the discharge opening and means for securing the plate in adjusted position.

3. An implement as claimed in claim 1 in which the discharge opening is closed by a slide plate and means operatively connected between the foot and said slide plate for moving the latter upon downward movement and upward movement of said plunger, said slide plate forming part of said cooperating means for discharging material from said hopper.

4. An implement as claimed in claim 1 in which the cooperating means for discharging material from said hopper comprises a slide plate normally closing the discharge opening of the hopper, a receiving chamber auxiliary to the hopper and with which said discharge opening communicates when open, a gate valve for the receiving chamber normally held open by said slide plate establishing communication between said tubular means and the chamber, spring means urging said gate valve to closed position and means operatively connected between the foot and said slide plate for moving the latter to uncover the discharge opening and release said gate valve on downward movement of the plunger, said operatively connected means moving said plate to close the discharge opening on upward movement of the plunger, said plate in the latter movement engaging the valve gate to discharge material from the chamber through said tubular means.

5. An implement as claimed in claim 1 in which the cooperating means for discharging material includes a fitting connected with the hopper adjacent to the discharge opening, said fitting having a chamber designed to communicate with the hopper through said discharge opening, a gate valve forming the base of said chamber, spring means urging said valve to closed position and slidable means engaging said gate valve to open the latter upon upward movement of said plunger.

6. A garden implement comprising a foot having an elongated passage therethrough and formed with an earth compressing face at one end surrounding said passage, a plunger connected with said foot aligned with and projectable through said opening into the earth when said foot is bearing upon the latter to form an elongated hole therein, said foot, forming means for compressing the earth over the area surrounding said hole to prevent adjacent earth from discharging thereinto, a tubular member connecting with said foot and communicating with said passage, a hopper carried by said plunger having a controllable discharge opening therein and tubular means movable with said plunger and operatively connected with said tubular member for establishing communication between said hopper and the passage in said foot and cooperating means for discharging material from said hopper through said tubular means upon withdrawing said plunger from the earth through said foot, and means for adjusting the extent of movement of said plunger.

7. A garden implement comprising a foot having an elongated passage therethrough and formed with an earth compressing face at one end surrounding said passage, a plunger connected with said foot aligned with and projectable through said opening into the earth when said foot is bearing upon the latter to form an elongated hole therein, said foot, forming means for compressing the earth over the area surrounding said hole to prevent adjacent earth from discharging thereinto, a tubular member connecting with said foot and communicating with said passage, a hopper carried by said plunger having a discharge opening, tubular means movable with said plunger and designed to communicate with said hopper through the discharge opening, a slide plate on the hopper normally closing the discharge opening and a rod connected with said slide plate and operatively connected with said foot for causing relative movement between the slide plate and hopper uncovering said discharge opening upon downward movement of said plunger.

8. An implement as claimed in claim 7 in which said tubular means is formed with a guide through which said rod is designed to pass, said rod having adjustable stop means thereon engageable by the guide to control the extent of movement of said plunger.

9. An implement as claimed in claim 7 in which the hopper is provided with a removable cover, means for securing the cover on the hopper and a handle on said cover for moving the hopper and connected plunger.

ALLAN MOYER BUEHLER.